(12) United States Patent
Laud

(10) Patent No.: US 7,733,921 B2
(45) Date of Patent: Jun. 8, 2010

(54) PACKET JITTER MITIGATION FOR BURSTY TRANSMISSION SYSTEMS

(75) Inventor: Timothy G. Laud, Libertyville, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 506 days.

(21) Appl. No.: 11/800,882

(22) Filed: May 8, 2007

(65) Prior Publication Data
US 2008/0279226 A1    Nov. 13, 2008

(51) Int. Cl.
*H04J 3/04* (2006.01)
(52) U.S. Cl. .................. 370/535; 370/537; 348/385.1
(58) Field of Classification Search .............. 370/535, 370/536, 537, 538, 540, 542; 348/385.1, 348/423.1
See application file for complete search history.

(56) References Cited

U.S. PATENT DOCUMENTS

| 5,729,292 | A | * | 3/1998 | Acampora et al. ..... 375/240.25 |
| 5,801,781 | A | * | 9/1998 | Hiroshima et al. .......... 348/441 |
| 5,946,352 | A | * | 8/1999 | Rowlands et al. ........... 375/242 |
| 6,748,435 | B1 | * | 6/2004 | Wang et al. ................. 709/225 |
| 6,798,361 | B1 | * | 9/2004 | Bretl et al. ..................... 341/50 |
| 6,873,629 | B2 | * | 3/2005 | Morris ....................... 370/535 |
| 7,460,476 | B1 | * | 12/2008 | Morris et al. ............. 370/230.1 |
| 2002/0157101 | A1 | * | 10/2002 | Schrader et al. ............... 725/64 |

* cited by examiner

*Primary Examiner*—Jason E Mattis
*Assistant Examiner*—Dady Chery

(57) ABSTRACT

Audio packets occupy spaces in a packet stream so as to reduce packet jitter in a receiver.

21 Claims, 2 Drawing Sheets

US 7,733,921 B2

PACKET JITTER MITIGATION FOR BURSTY TRANSMISSION SYSTEMS

TECHNICAL FIELD

The technical field of this application relates to reducing packet jitter in bursty transmission systems such as those relating to the transmission of enhanced data in a digital television environment.

BACKGROUND

The ATSC digital television standard has been extended to allow a field to contain a mix of more robustly coded data (referred to herein as enhanced data) and the data currently provided for in the standard (referred to herein as VSB data). Further similar extensions are being investigated. Preferably, though not necessarily, the data mix is employed on a segment-by-segment basis such that, ignoring the effects of interleaving in the encoder, some segments of a field are used to transmit VSB data exclusively and the remaining segments of the field are used to transmit enhanced data segments exclusively. However, it is possible that all data segments of a field could contain either enhanced data segments exclusively or VSB data segments exclusively. Moreover, it is also possible that some of the enhanced data contained in a field may be coded with one robust coding rate and that other enhanced data contained in the field may be coded at other robust coding rates.

Accordingly, the ATSC digital television standard permits the transmission of enhanced data packets along with the typical main signal packets such as video packets, audio packets, and control packets usually associated with digital television programming. As indicated above, the data in the enhanced data packets is enhanced with extra coding in order to provide greater robustness so as to increase the likelihood that the enhanced data will be properly received in spite of noise, such as noise caused by the transmission channel.

In many transmission schemes for the transmission of enhanced data, the introduction of the enhanced data packets forces the main signal packets to new time locations in the transport stream. This relocation of the main signal packets is commonly called packet jitter.

The term "legacy receiver" is used herein to denote older digital television receivers that have not been built to effectively receive and process a digital television signal containing enhanced data packets. The buffers, particularly the audio buffers, of legacy receivers tend to be too small to permit these legacy receivers to effectively manage a received digital television signal containing enhanced data packets. As a result, the transmission of a digital television signal containing enhanced data causes packet jitter in legacy receivers.

For example, according to ISO 13818-1, the decoder of a receiver includes a transport buffer definition that limits the maximum data rate. Similarly, a main buffer holds a larger portion of data to be processed and essentially defines a minimum data rate burst for a particular type of transport stream. The maximum data rate translates to multiple packet advancement in time, and the minimum data rate translates to packet delay.

A single packet displacement is easily handled by the buffers. However, displacement of larger groups of packets becomes problematic. Therefore, because of the buffer limitations, the packets in the transport stream must be carefully ordered in order to reduce packet jitter.

The present invention overcomes one or more of these or other problems.

SUMMARY OF THE INVENTION

According to one aspect of the present invention, a method of transmitting a digital signal comprises the following: packing main stream audio data from an input data stream into an output data stream according to a first priority; ignoring delayed null data in the input data stream; packing main stream non-audio data from the input data stream into the output data stream according to a second priority, wherein the second priority is lower than the first priority; packing enhanced data into the output data stream, wherein the enhanced data comprises data that is more robustly coded than the main stream audio data and the main stream non-audio data; and, transmitting the output data stream containing the packed main stream audio data, the packed main stream non-audio data, and the packed enhanced data.

According to another aspect of the present invention, a method of packing digital data from an input packet stream to an output packet stream is provided. The output packet stream includes reserved packing spaces and unreserved packing spaces, the input packet stream has an other pointer and an audio pointer associated therewith, and the output packet stream has a fill pointer associated therewith. The method comprises the following: a) if the fill pointer points to one of the reserved packing spaces, packing no main stream audio packets, no main stream non-audio packets, and no null packets from the input packet stream to the space of the output packet stream to which the fill pointer points; b) if the fill pointer points to one of the unreserved packing spaces, and if the audio pointer is less than or equal to the fill pointer, (i) packing a main stream audio packet from a space in the input packet stream to which the audio pointer points to a space in the output packet stream to which the fill pointer points, (ii) incrementing the audio pointer to a next space in the input packet stream containing an audio packet, and (iii) incrementing the fill pointer to a next space in the output packet stream; c) if the fill pointer points to one of the unreserved packing spaces, if the audio pointer is not less than or equal to the fill pointer, and if the other pointer is less than or equal to the fill pointer, packing a main stream non-audio, non-null packet from a space in the input packet stream to which the other pointer points to a space in the output packet stream to which the fill pointer points, (ii) incrementing the other pointer to a next space in the input packet stream containing a non-audio, non-null packet, and (iii) incrementing the fill pointer to a next space in the output packet stream; and, d) if the fill pointer points to one of the unreserved packing spaces, if the audio pointer is not less than or equal to the fill pointer, and if the other pointer is not less than or equal to the fill pointer, (i) packing a remaining packet from the input packet stream to a space in the output packet stream to which the fill pointer points, and (ii) incrementing the fill pointer to a next space in the output packet stream.

According to still another aspect of the present invention, a method of packing digital data from an input packet stream to an output packet stream is provided. The output packet stream includes reserved packing spaces and unreserved packing spaces, the input packet stream has an other pointer and an audio pointer associated therewith, and the output packet stream has a fill pointer associated therewith. The method comprises the following: a) if the fill pointer points to one of the reserved packing spaces, packing no main stream audio packets, no main stream non-audio packets, and no null packets from the input packet stream to the space of the output packet stream to which the fill pointer points; b) if the fill pointer points to one of the unreserved packing spaces, if the audio pointer is less than or equal to the fill pointer, and if an audio buffer counter has a count less than x, (i) packing a main stream audio packet from a space in the input packet stream to which the audio pointer points to a space in the output packet stream to which the fill pointer points, (ii) incrementing the audio pointer to a next space in the input packet stream containing an audio packet, (iii) incrementing the fill pointer to a next space in the output packet stream, and (iv) adding y to the count of the audio buffer counter, wherein x and y are numbers; c) decrementing the count of the audio buffer counter by one for each increment of the fill pointer; d) if the fill pointer points to one of the unreserved packing spaces, if the audio pointer is not less than or equal to the fill pointer, and if the other pointer is less than or equal to the fill pointer, packing a main stream non-audio, non-null packet from a space in the input packet stream to which the other pointer points to a space in the output packet stream to which the fill pointer points, (ii) incrementing the other pointer to a next space in the input packet stream containing a non-audio, non-null packet, and (iii) incrementing the fill pointer to a next space in the output packet stream; and, e) if the fill pointer points to one of the unreserved packing spaces, if the audio pointer is not less than or equal to the fill pointer, and if the other pointer is not less than or equal to the fill pointer, (i) packing a remaining packet from the input packet stream to a space in the output packet stream to which the fill pointer points, and (ii) incrementing the fill pointer to a next space in the output packet stream.

BRIEF DESCRIPTION OF THE DRAWING

These and other features and advantages will become more apparent from the detailed description below when taken in conjunction with the drawings in which.

DETAILED DESCRIPTION

Figure 1:
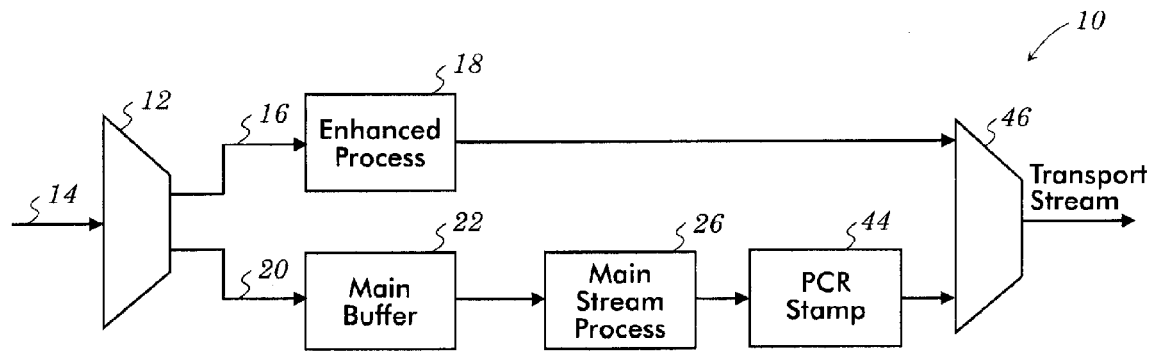
FIG. 1 shows a portion of a transmitter according to an embodiment of the present invention.

FIG. 1 shows a transmitter portion 10 in which a transport stream containing enhanced data is assembled for transmission to a receiver. The transmitter portion 10 includes a demultiplexer 12 that receives a digital television transport stream over a digital television transport stream path 14. An example of a portion of the digital television transport stream received by the demultiplexer 12 over the digital television transport stream path 14 is shown in FIG. 2, where each square of FIG. 2 represents a corresponding packet.

Figure 2:
FIG. 2 shows an example of a portion of a digital television transport stream processed by the transmitter portion of FIG. 1.

As shown in FIG. 2, the A packets are data packets containing data-to-be-enhanced, the B packets are main non-audio packets (e.g., video packets, PSIP packets, etc.), the C packets are main audio packets, and the D packets are null packets.

The demultiplexer 12 separates the data-to-be-enhanced packets A from the main non-audio packets B, the main audio packets C, and the null packets D, and supplies the data-to-be-enhanced packets A over an enhanced data packet stream path 16 to an enhanced data process 18 that suitably processes the data-to-be-enhanced packets A so as to make the data in the data-to-be-enhanced packets A more robust. The enhanced data process 18 performs extra coding (i.e., coding that is in addition to the coding used for the main non-audio packets B and the main audio packets C) in order to enhance the data in the data-to-be-enhanced packets A. For example, the enhanced data process 18 may include an encoder the performs the coding to enhance the data. One example of such an encoder is a ½ rate encoder that encodes each input bit as two output bits. The enhanced data process 18 may perform other processing such as interleaving.

Figure 3:
FIG. 3 shows an example input main packet stream resulting from processing by the demultiplexer of FIG. 1.

The demultiplexer 12 directs the main stream packets, (i.e., the main non-audio packets B, the main audio packets C, and the null packets D) over a main packet stream path 20 to a main buffer 22. As shown in FIG. 3, the demultiplexer 12 replaces the data-to-be-enhanced packets A in the digital television transport stream received over the digital television transport stream path 14 with null packets D in the main packet stream that is directed over the main packet stream path 20.

As can be seen by comparing FIGS. 2 and 3, the timing of the main packet stream path 20 is not changed because of the replacement null packets D. (Instead of replacing the data-to-be-enhanced packets A with null packets D, all of the null packets could be removed and the remaining main non-audio packets B and main audio packets C in the main packet stream path 20 could be time stamped.)

Receivers capable of receiving enhanced data packets will be configured to handle packet jitter effectively. For example, these receivers may be provided with larger main stream buffers that can accommodate the repositioning of packets in the transport stream when enhanced data packets are added. However, legacy receivers have not been so designed and must be made to effectively handle packet jitter.

In order to mitigate the effects of packet jitter in legacy receivers, new processing in the transmitter is required in order to comply with the buffer definitions of legacy receivers. For example, when the data space is modified in the transmitter to permit the placement of enhanced data packets in the transport stream, the main stream packets B, C, and D must be moved around to fit the remaining space.

Figure 4:
FIG. 4 shows one example of relative amounts of enhanced data and main data to be transmitted to receivers.

FIG. 4 shows example relative amounts of transmitted enhanced data and main data (where main data includes main non-audio data, audio data, and null data). A first amount E corresponds to first enhanced data, a first amount F corresponds to first main data, a second amount E corresponds to second enhanced data, a second amount F corresponds to second main data, etc. The amount E plus the amount F may be sufficient, for example, to fill the 312 data segments of a field (a field comprises one field synchronization segment and 312 data segments) in a digital television signal. For example, there may be 118 segments of enhanced data and 194 segments of main data in such a field. However, other relative amounts of enhanced data and main data could instead be used. For example, the relative amounts of enhanced data and main data can vary from 0% enhanced data, 100% main data to 100% enhanced data, 0% main data.

A known first method of positioning the main data so as to form the digital transport stream essentially comprises three steps. The first step is to remove all null packets from the input main packet stream.

Figure 5:
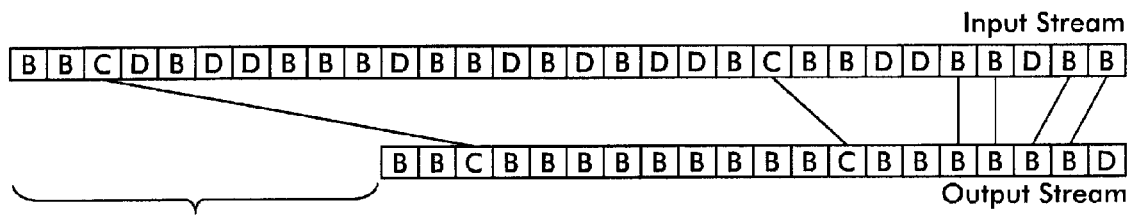
FIG. 5 is useful in explaining one method of processing the example input main packet stream of FIG. 3.

The second step is a data packing step. In this second step, the main non-audio packets B and the main audio packets C are packed together so as to remove any spaces left by the removal of the null packets and so as to preserve the relative positions between the main non-audio packets B and the main audio packets C, thereby forming an output main packet stream. The input and output main packet streams of FIG. 5 show the results of this processing. Also shown in FIG. 5, this processing creates a reserved portion 24 in the output main packet stream in front of the main non-audio packets B and the main audio packets C. The data packing second step is completed by packing the enhanced data packets into the reserved portion 24.

The third step is to fill the output main packet stream with sufficient null packets to fill up a field. Thus, if the first two steps leave empty segments, such as at the end of the field, the empty segments are filled with null packets to complete the field.

This known first method will result in packet jitter. The packet jitter can be reduced by using a second method instead of the first method to pack data together. The second method generally involves the following three steps: packing audio packets from the input main packet stream into the output main packet stream according to a first or primary priority; ignoring any delayed null packets; and, packing non-audio packets from the input main packet stream into the output main packet stream according to a second or secondary priority. Thus, a higher priority is given to the packing of audio packets than to the packing of non-audio packets. These steps are not necessarily sequential or compartmentalized. This second method may be implemented by a main stream process 26 shown in FIG. 1.

Figure 6:
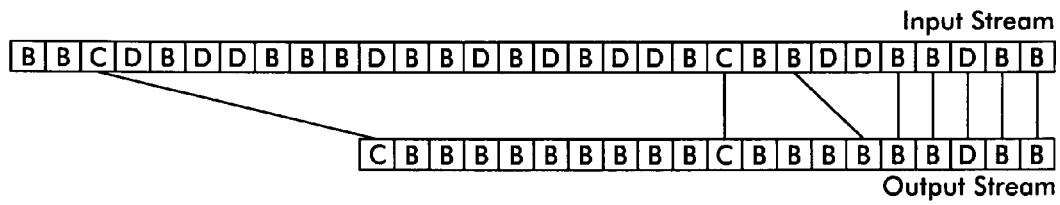
FIG. 6 is useful in explaining another method of processing the example input main packet stream of FIG. 3.

The main stream process 26 reduces audio packet jitter because, as shown by the example of FIG. 6, the main audio packets C in the output main packet stream line up closer to their original positions in the input main packet stream than is the case when the first method processing is implemented. FIG. 5 shows an example of the results of the first method processing. As can be seen by comparing FIGS. 5 and 6, the main audio packets C in the output main packet streams line up farther away from their original positions using the first method processing than is the case when the second method processing is implemented. While the simple example shown in FIG. 6 demonstrates the improvement in audio packet jitter reduction, the actual degree of improvement is much greater over the full repeat cycle of the enhanced/main packing pattern.

The main stream process 26, for example, implements the second method by executing code in accordance with the following pseudo code:

| PSEUDO CODE A: | |
|---|---|
| WHILE FILL_ptr < total packets of maximum cycle | ;for largest cadence cycle |
|   IF FILL_ptr is in enhanced data space | |
|     Do not use MAIN data | |
|   ELSE IF AUDIO_ptr <= FILL_ptr | ;copy audio first |
|     COPY AUDIO PACKET TO OUTPUT STREAM | |
|     AUDIO_ptr++ | ;next audio packet |
|     FILL_ptr++ | ;next space to fill |
|   ELSE IF OTHER_ptr <= FILL_ptr | |
|     COPY OTHER PACKET TO OUTPUT STREAM | |
|     OTHER_ptr++ | ;next other packet (non-audio, non-null) |
|     FILL_ptr++ | |
|   ELSE | |
|     WHILE NOT END OF FIELD | |
|       COPY FROM INPUT STREAM | ;copy other, audio and null |
|       FILL_ptr++ | |
|     END WHILE | |
|     AUDIO_ptr++ | ;next audio packet (past FILL_ptr) |
|     OTHER_ptr++ | ;next other packet (non-audio, non-null)(past FILL_ptr) |
| END WHILE | ;largest cadence |

Figure 7:
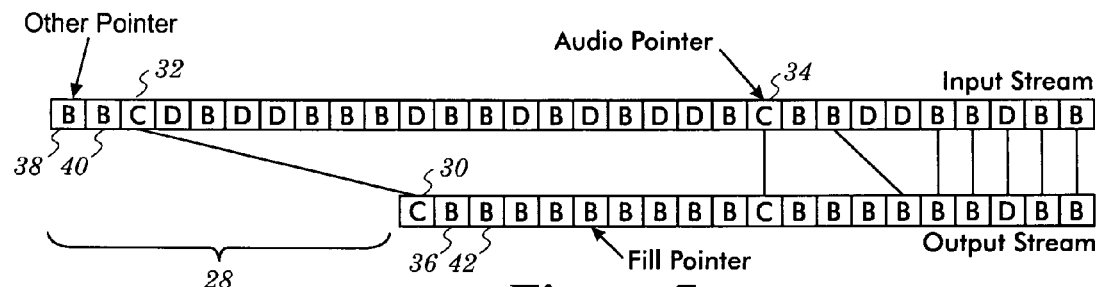
FIG. 7 illustrates the addition of pointers to the packet streams of FIG. 6; and, FIG. 8 illustrates an example of a receiver for use in connection with the present invention.

FIG. 6 has been replicated in FIG. 7 and the three pointers used by the main stream process 26 from PSEUDO CODE A have been added at example positions as shown in FIG. 7. The operation, which is designated in PSEUDO CODE A as ptr++, indicates that the corresponding pointer is incremented. The value to which the corresponding pointer is incremented is indicated in PSEUDO CODE A.

As shown by PSEUDO CODE A, while the fill pointer is less that the total packets of the maximum cycle, the main stream process 24 continuously executes the algorithm represented by PSEUDO CODE A. The maximum cycle, for example, may be 30 fields.

During execution, with the fill pointer pointing to a space in the output main packet stream to be filled (packed), a decision is made at to whether that space is to receive a packet and, if the space is to receive a packet, what type of packet the space is to receive. After the decision is implemented, the fill pointer is incremented to the next space in the output main packet stream and the decision is again made, but this time with respect to this next space. Thus, the fill pointer is incremented successively through the spaces in the output main packet stream.

While the fill pointer points to a space that is to receive no main stream packet, (e.g., any space in reserved portion 28 of the output main packet stream as shown in FIG. 7; i.e., the portion reserved at the beginning of a field for enhanced data packets), no main data is packed into the output main packet stream because the fill pointer is in that portion of the output main packet stream which is reserved for enhanced data as discussed below.

If the fill pointer is pointing at an enhanced data space, no main data is used.

Thus, as shown in FIG. 7, as long as the fill pointer is pointing to packet spaces in the reserved portion 28, no fill operation is conducted.

If the fill pointer is not in the enhanced data space (the reserved portion 28 of FIG. 7), and if the audio pointer is less than or equal to the fill pointer, three actions are executed. (i) The audio packet in the space of the input stream to which the audio pointer is pointing is copied (packed) from the input main packet stream into the space of the output main packet stream to which the fill pointer is pointing. This audio packet then becomes the next packet in the output main packet stream from the main stream process 26. (ii) The audio pointer is incremented to the space in the input main packet stream containing the next audio packet. (iii) The fill pointer is incremented to the next space in the output main packet stream.

Thus, as shown by way of example in FIG. 7, when the fill pointer reaches the first space in the output main packet stream that is not in the reserved portion 28 (i.e., space 30), the audio pointer will be pointing to the first space in the input main packet stream containing an audio packet, i.e., space 32. Accordingly, because the audio pointer is less than the fill pointer, the audio packet in the space 32 will be packed into the space 30. The audio pointer is then incremented to the next space in the input main packet stream containing an audio packet, i.e., space 34. Also, the fill pointer is incremented to the next space in the output main packet stream, i.e., space 36.

If the fill pointer is not in the enhanced data space, if the audio pointer is not less than or equal to the fill pointer, and if the other pointer is less than or equal to the fill pointer, three actions are executed. (i) The packet in the space of the input main packet stream to which the other pointer is pointing is copied (packed) into the space in the output main packet stream to which the fill pointer is pointing. This non-audio, non-null packet becomes the next packet in the output main packet stream. (ii) The other pointer is incremented to the space in the input main packet input stream containing the next packet that is neither an audio packet nor a null packet. (iii) The fill pointer is incremented to the next space in the output main packet stream.

Thus, as shown by way of example in FIG. 7, when the fill pointer reaches the space 36, the other pointer will be pointing to space 38 containing the first non-audio, non-null packet (i.e., a non-audio, non-null packet is a packet that is neither an audio packet nor a null packet). Accordingly, because the other pointer is less than the fill pointer, the non-audio, non-null packet in the space 38 is packed into the space 36. Then, the other pointer is incremented to the next space of the input main pack stream that contains a non-audio, non-null packet, i.e., space 40, and the fill pointer is incremented to the next space, i.e., space 42, of the output main packet stream.

Because the fill pointer is still not in the enhanced data space, because the audio pointer is still not less than or equal to the fill pointer, and because the other pointer is still less than or equal to the fill pointer, the main stream process 26 will copy another non-audio, non-null packet from the input main packet stream to the output main packet stream, thus ignoring delayed null packets. (Delayed null packets are those null packets that are in spaces of the input main packet stream that are before the space in the output main packet stream to which the fill pointer is currently pointing. Thus, during execution of PSEUDO CODE A in connection with the example of FIG. 7, all null packets in the input main packet stream except for the last null packet will be delayed null packets. This last null packet may be referred to a non-delayed null packet.)

If the fill pointer is not in the enhanced data space of the output main packet stream, if the audio pointer is not less than or equal to the fill pointer, and if the other pointer is not less than or equal to the fill pointer, two actions are executed until the end of the current field is reached. (i) The next packet in the input main packet stream is copied (packed) into the space of the output main packet stream to which the fill pointer is pointing and becomes the next packet in the output main packet stream. (ii) The fill pointer is incremented to the next space in the output main packet stream to be filled.

This process is repeated until the end of the field is reached, at which time the audio pointer is incremented to the first space in the input main packet stream containing the first audio packet of the next field, and the other pointer is incremented to the first space in the input main packet stream containing the first non-audio, non-null packet of the next field. The process represented by PSEUDO CODE A then repeats.

As can be seen by comparing FIGS. 5 and 7, the second method places the audio packets in the output main packet stream closer to their original positions in the input main packet stream and, therefore, reduces packet jitter.

There is an alternative to the algorithm represented by PSEUDO CODE A that prevents the violation of the audio transport buffer model. The audio transport buffer can hold three packets of audio data, but only empties at a 2 Mbit rate, which means that more than three packets of audio information in a row cause this buffer to overflow since the input rate is 20 Mbps. A remedy for this problem is to make sure that, if the next (fourth) audio packet occurs within fewer than about ten packet times since the previous three consecutive audio packets, it is sufficiently delayed so it is not packed into the output main packet stream until about ten packet times after the previous three consecutive packets. The following pseudo code performs this delay function on an as-needed basis:

| PSEUDO CODE B: | |
|---|---|
| WHILE FILL_ptr < total packets of maximum cycle | ;for largest cadence cycle |
|   IF FILL_ptr is in enhanced data space | |
|     Do not use MAIN data | |
|   ELSE IF AUDIO_ptr <= FILL_ptr | ;copy audio first |
|     IF A_TB<21 | |
|       COPY AUDIO PACKET TO OUTPUT STREAM | |
|       AUDIO_ptr++ | ;next audio packet |
|       FILL_ptr++ | ;next space to fill |
|       A_TB=+10 | ;add 10 packets to audio transport buffer delay counter |

---
PSEUDO CODE B:
---

```
ELSE IF OTHER_ptr <= FILL_ptr
    COPY OTHER PACKET TO OUTPUT STREAM
        OTHER_ptr++                              ;next other packet (non-
                                                  audio, non-null)
    FILL_ptr++
    A_TB--
    ;decrement A_TB on subsequent FILL_ptr increments - minimum zero
ELSE
    WHILE NOT END OF FIELD
        COPY FROM INPUT STREAM                   ;copy other, audio and null
        FILL_ptr++
    A_TB--      ;decrement A_TB, minimum zero
    END WHILE
        AUDIO_ptr++                              ;next audio packet (past
                                                           FILL_ptr)
        OTHER_ptr++                              ;next other packet (non-
                                                  audio, non-null)(past
                                                  FILL_ptr)
END WHILE
```

PSEUDO CODE B adds a transport buffer delay counter A_TB that is incremented by ten each time that an audio packet is copied from the input main packet stream to the output main packet stream and that is decremented on each increment of the fill pointer. When the fill pointer is not in the enhanced data space (the reserved portion 28 of FIG. 7), and when the audio pointer is less than or equal to the fill pointer, the transport buffer delay counter A_TB is tested to determine whether its count is less than twenty-one. If the count of the transport buffer delay counter A_TB is less than twenty-one indicating that the audio data rate is not too high, then audio data is copied. However, if the count of the transport buffer delay counter A_TB is not less than twenty-one indicating that the audio data rate is too high, no audio data is copied at this time and instead the next else portion of the pseudo code is executed.

Execution according to either PSEUDO CODE A or PSEUDO CODE B effectively packs audio packets into the output main packet stream according to a first priority, packs non-audio packets into the output main packet stream according to a second priority that is lower than the first priority, and ignores delayed null packets.

As shown in FIG. 1, a program clock reference (PCR) restamp processor 44 restamps the PCR of the packets in the output main packet stream supplied by the main stream process 26. Since the data packets in the output main packet stream are generally shifted relative to their original positions, the receiver buffer fullness will tend to be different from that of the original stream. A PCR adjustment should be done to adjust the average data in the receiver buffers. The PCR is based on a 27 MHz clock. A one millisecond offset is a count of 27,000. Therefore, the PCRs of the packets at the output of the main stream process 26 should be restamped to compensate for the repositioning done by the main stream process 26. Additionally, an offset should be made to the PCR value at that time. Because the presentation time stamp (PTS) and the decoding time stamp (DTS) values are not changed and the PCR is, the decoding will occur at a different time causing a change in the average buffer fullness.

The transmitter portion 10 includes a multiplexer 46 that combines the enhanced data packets from the enhanced data process 18 and the audio packets, the non-audio packets, and the null packets from the PCR restamp processor 44 so as to form a transport stream. As discussed above, the enhanced data packets are inserted at the beginning of a field (in the reserved portion 28) ahead of the audio packets, the non-audio packets, and the null packets from the PCR restamp processor 44.

Figure 8:
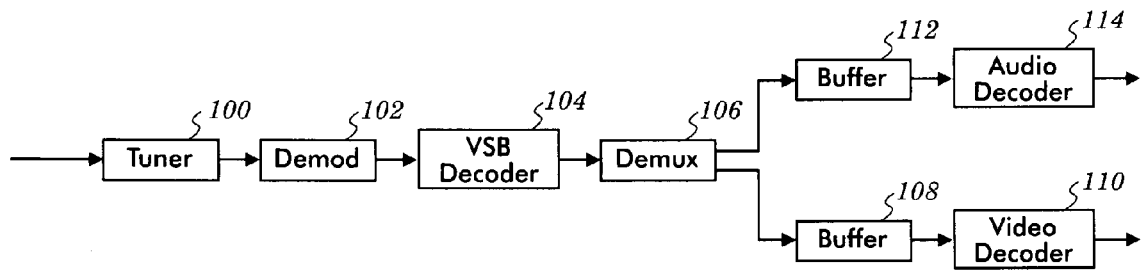

As shown in FIG. 8, the signal transmitted by the transmitter that includes the transmitter portion 10 is received by a receiver comprising a tuner 100. The IF output of the tuner 100 is demodulated by an ATSC demodulator 102 in order to provide an analog baseband output representing the transmitted symbols. As desired, this analog signal may be sampled by an A/D converter under control of a digital processor to convert the demodulated symbols into corresponding multibit digital values. Other arrangements of demodulators, such as where the output of the tuner 100 is digitized before further processing, may also be used.

The output of the demodulator 102 is passed to a VSB processor 104. The VSB processor 104 decodes and otherwise processes the VSB data contained in the demodulated output from the demodulator 102. The VSB processor 104 is followed by a demultiplexer 106 that separates the video data from the audio data. The video data is processed by a video buffer 108 and a video decoder 110. The video buffer 108 may include a transport buffer. The audio data is held in an audio buffer 112 before the audio data is decoded by an audio decoder 114.

Certain modifications of the present invention have been discussed above. Other modifications of the present invention will occur to those practicing in the art of the present invention. For example, as described above, the data-to-be-enhanced packets A in the transport stream of FIG. 2 are replaced with null packets D as shown by FIG. 3. Instead, all of the null packets in the transport stream of FIG. 2 could be removed provided that the remaining packets B and D in the main packet stream path 18 are suitably time stamped.

As another example, spaces reserved for the enhanced data packets may be scattered throughout the output main packet stream rather than placed contiguously at the beginning of the output main packet stream as shown in FIGS. 5, 6, and 7. In this case, if the fill pointer points to a reserved space (i.e., a space reserved for enhanced data), no data from the input main packet stream is packed into that space in the output main packet stream. On the other hand, if the fill pointer points to a unreserved space (i.e., a space that is not reserved for enhanced data), data from the input main packet stream is packed into that space in the output main packet stream depending on whether the audio pointer is less than or equal to the fill pointer and the other pointer is less than or equal to the fill pointer as given in PSEUDO CODE A and B. In this example, the end of field condition is satisfied at the end of the contiguous non-reserved space.

Moreover, the present invention is described above with particular reference to VSB digital television systems. However, the present invention may also be applied to other digital audio and/or television systems.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of transmitting a digital signal comprising:
    packing main stream audio data from an input data stream into an output data stream according to a first priority;
    ignoring delayed null data in the input data stream;
    packing main stream non-audio data from the input data stream into the output data stream according to a second priority, wherein the second priority is lower than the first priority;
    packing enhanced data into the output data stream, wherein the enhanced data comprises data that is more robustly coded than the main stream audio data and the main stream non-audio data; and,
    transmitting the output data stream containing the packed main stream audio data, the packed main stream non-audio data, and the packed enhanced data.

2. The method of claim 1 further comprising:
    receiving an input transport stream containing data-to-be-enhanced, the main stream audio data, the main stream non-audio data, and null data;
    de-multiplexing the input transport stream into first and second outputs, wherein the first output contains the data-to-be-enhanced but not the main stream audio data, the main stream non-audio data, and the null data, and wherein the second output contains the main stream audio data, the main stream non-audio data, and the null data but not the data-to-be-enhanced; and,
    supplying the second output as the input data stream.

3. The method of claim 2 wherein the supplying of the second output as the input data stream comprises adding null data to replace the data-to-be-enhanced.

4. The method of claim 2 further comprising coding the data-to-be-enhanced in the first output as the enhanced data such that the enhanced data is more robust than the data-to-be-enhanced.

5. The method of claim 4 wherein the supplying of the second output as the input data stream comprises adding null data to replace the data-to-be-enhanced.

6. The method of claim 1 further comprising packing non-delayed null data into the output data stream prior to transmitting the output data stream.

7. The method of claim 6 further comprising:
    receiving an input transport stream containing data-to-be-enhanced, the main stream audio data, the main stream non-audio data, and null data;
    de-multiplexing the input transport stream into first and second outputs, wherein the first output contains the data-to-be-enhanced but not the main stream audio data, the main stream non-audio data, and the null data, and wherein the second output contains the main stream audio data, the main stream non-audio data, and the null data but not the data-to-be-enhanced; and,
    supplying the second output as the input data stream.

8. The method of claim 7 wherein the supplying of the second output as the input data stream comprises adding null data to replace the data-to-be-enhanced.

9. The method of claim 7 further comprising coding the data-to-be-enhanced in the first output as the enhanced data such that the enhanced data is more robust than the data-to-be-enhanced.

10. The method of claim 9 wherein the supplying of the second output as the input data stream comprises adding null data to replace the data-to-be-enhanced.

11. The method of claim 1 wherein the digital signal comprises a VSB digital television signal, wherein the main stream audio data comprises VSB audio data, and wherein the main stream non-audio data comprises VSB non-audio data.

12. A method performed by an electronic processor of packing digital data from an input packet stream to an output packet stream, wherein the output packet stream includes reserved packing spaces and unreserved packing spaces, wherein the input packet stream has an other pointer and an audio pointer associated therewith, and wherein the output packet stream has a fill pointer associated therewith, the method comprising:
    a) if the fill pointer points to one of the reserved packing spaces, packing no main stream audio packets, no main stream non-audio packets, and no null packets from the input packet stream to the space of the output packet stream to which the fill pointer points;
    b) if the fill pointer points to one of the unreserved packing spaces, and if the audio pointer is less than or equal to the fill pointer, (i) packing a main stream audio packet from a space in the input packet stream to which the audio pointer points to a space in the output packet stream to which the fill pointer points, (ii) incrementing the audio pointer to a next space in the input packet stream containing an audio packet, and (iii) incrementing the fill pointer to a next space in the output packet stream;
    c) if the fill pointer points to one of the unreserved packing spaces, if the audio pointer is not less than or equal to the fill pointer, and if the other pointer is less than or equal to the fill pointer, packing a main stream non-audio, non-null packet from a space in the input packet stream to which the other pointer points to a space in the output packet stream to which the fill pointer points, (ii) incrementing the other pointer to a next space in the input packet stream containing a non-audio, non-null packet, and (iii) incrementing the fill pointer to a next space in the output packet stream; and,
    d) if the fill pointer points to one of the unreserved packing spaces, if the audio pointer is not less than or equal to the fill pointer, and if the other pointer is not less than or equal to the fill pointer, (i) packing a remaining packet from the input packet stream to a space in the output packet stream to which the fill pointer points, and (ii) incrementing the fill pointer to a next space in the output packet stream.

13. The method of claim 12 wherein the reserved packing spaces are contiguous at a beginning of the output packet stream.

14. The method of claim 12 further comprising packing enhanced data packets into the reserved packing spaces.

15. The method of claim 12 further comprising transmitting the output packet stream.

16. The method of claim 12 wherein the digital data comprises VSB digital television data, wherein the main stream audio packets comprise VSB audio packets, wherein the main stream non-audio packets comprise VSB non-audio packets, and wherein the main stream non-audio, non-null packet comprises a VSB non-audio, non-null packet.

17. A method performed by an electronic processor of packing digital data from an input packet stream to an output packet stream, wherein the output packet stream includes reserved packing spaces and unreserved packing spaces, wherein the input packet stream has an other pointer and an audio pointer associated therewith, and wherein the output packet stream has a fill pointer associated therewith, the method comprising:
   a) if the fill pointer points to one of the reserved packing spaces, packing no main stream audio packets, no main stream non-audio packets, and no null packets from the input packet stream to the space of the output packet stream to which the fill pointer points;
   b) if the fill pointer points to one of the unreserved packing spaces, if the audio pointer is less than or equal to the fill pointer, and if an audio buffer counter has a count less than x, (i) packing a main stream audio packet from a space in the input packet stream to which the audio pointer points to a space in the output packet stream to which the fill pointer points, (ii) incrementing the audio pointer to a next space in the input packet stream containing an audio packet, (iii) incrementing the fill pointer to a next space in the output packet stream, and (iv) adding y to the count of the audio buffer counter, wherein x and y are numbers;
   c) decrementing the count of the audio buffer counter by one for each increment of the fill pointer;
   d) if the fill pointer points to one of the unreserved packing spaces, if the audio pointer is not less than or equal to the fill pointer, and if the other pointer is less than or equal to the fill pointer, packing a main stream non-audio, non-null packet from a space in the input packet stream to which the other pointer points to a space in the output packet stream to which the fill pointer points, (ii) incrementing the other pointer to a next space in the input packet stream containing a non-audio, non-null packet, and (iii) incrementing the fill pointer to a next space in the output packet stream; and,
   e) if the fill pointer points to one of the unreserved packing spaces, if the audio pointer is not less than or equal to the fill pointer, and if the other pointer is not less than or equal to the fill pointer, (i) packing a remaining packet from the input packet stream to a space in the output packet stream to which the fill pointer points, and (ii) incrementing the fill pointer to a next space in the output packet stream.

18. The method of claim 17 wherein the reserved packing spaces are contiguous at a beginning of the output packet stream.

19. The method of claim 17 further comprising packing enhanced data packets into the reserved packing spaces.

20. The method of claim 17 further comprising transmitting the output packet stream.

21. The method of claim 17 wherein the digital data comprises VSB digital television data, wherein the main stream audio packets comprise VSB audio packets, wherein the main stream non-audio packets comprises VSB non-audio packets, and wherein the main stream non-audio, non-null packet comprises a VSB non-audio, non-null packet.

* * * * *